C. W. NEU.
CORN SNAPPER AND SHREDDER.
APPLICATION FILED JAN. 19, 1917.

1,221,364.

Patented Apr. 3, 1917.
2 SHEETS—SHEET 1.

Inventor
CLARENCE W. NEU
By Watson E. Coleman
Attorney

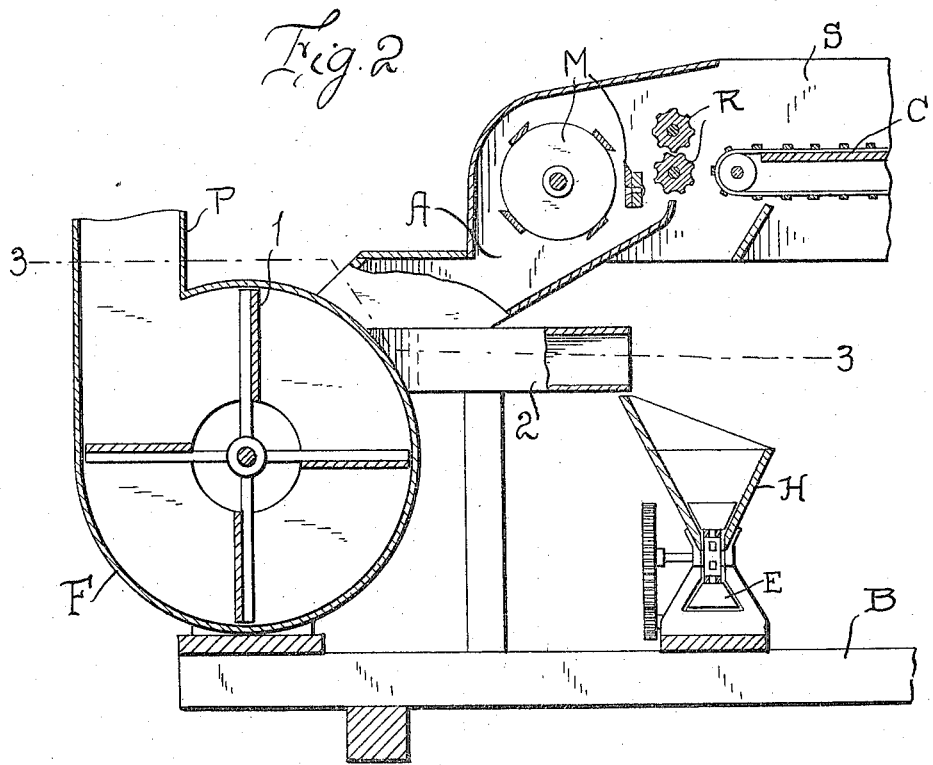
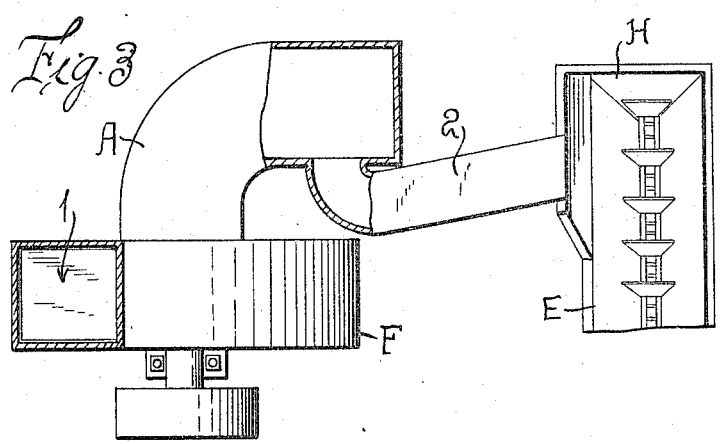

UNITED STATES PATENT OFFICE.

CLARENCE W. NEU, OF GEORGETOWN, OHIO.

CORN SNAPPER AND SHREDDER.

1,221,364.  Specification of Letters Patent.  Patented Apr. 3, 1917.

Application filed January 19, 1917. Serial No. 143,331.

*To all whom it may concern:*

Be it known that I, CLARENCE W. NEU, a citizen of the United States, residing at Georgetown, in the county of Brown and State of Ohio, have invented certain new and useful Improvements in Corn Snappers and Shredders, of which the following is a specification, reference being had to the accompanying drawings.

This invention relates to certain improvements in corn snappers and shredders; and it is an object of the invention to provide a device of this general character with novel and improved means whereby chaff or the like falling with the ears is readily and effectively collected.

It is also an object of the invention to provide a device of this general character including snapper rolls and an elevating mechanism arranged to receive the ears as dropped from the snapper rolls together with novel and improved means of a pneumatic character for collecting chaff or the like which may drop with the corn, and whereby said chaff or the like is prevented from being conveyed by the elevator.

The invention consists in the details of construction and in the combination and arrangement of the several parts of my improved threshing machine whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Fig. 2 is a fragmentary view partly in elevation and partly in section illustrating certain details of my improvements as herein disclosed; and Fig. 3 is an enlarged fragmentary view partly in top plan and partly in section of my improvements as herein included.

Figure 1:
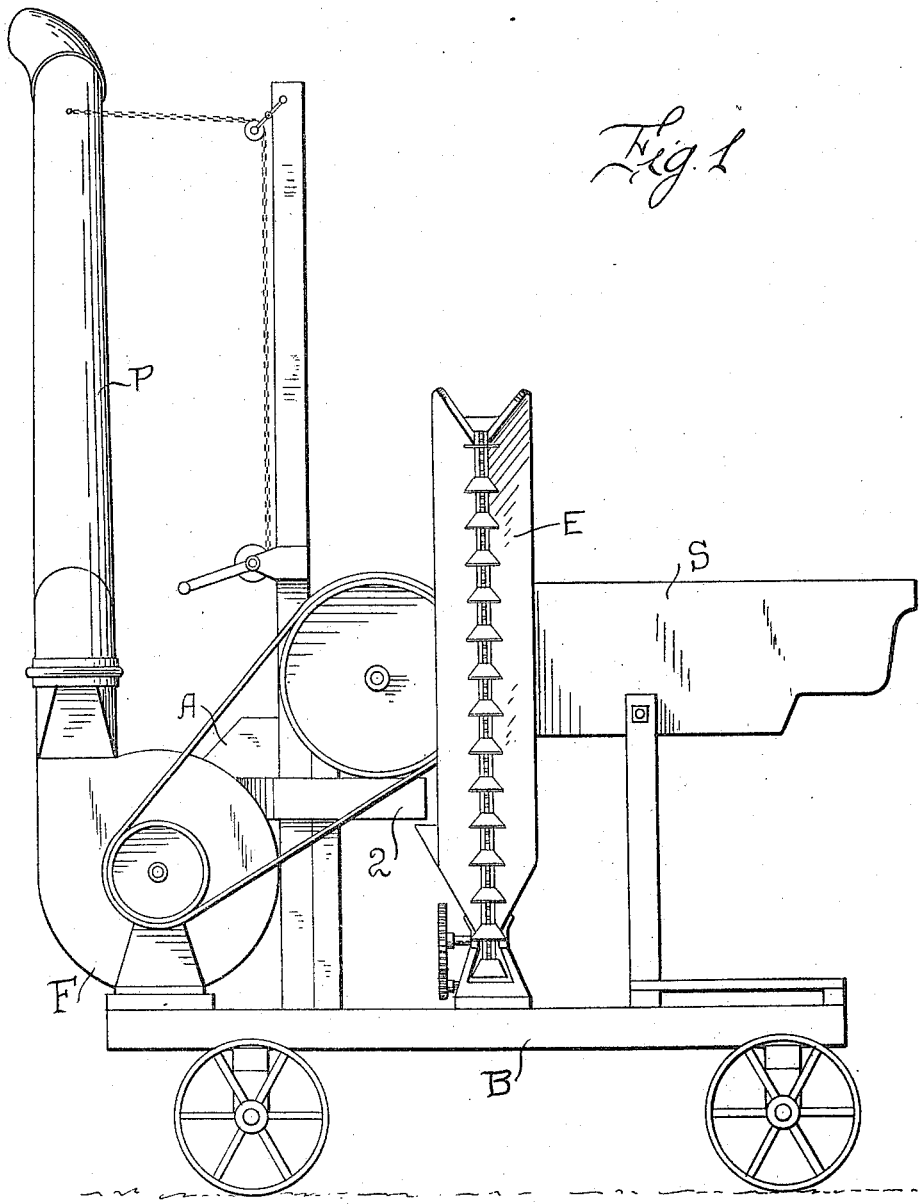
Figure 1 is an elevational view of a machine constructed in accordance with an embodiment of my invention.

As disclosed in the accompanying drawings, B denotes a wheel-supported body provided with the superstructure S. The superstructure S supports the endless carrier C which serves to convey the stalks to the snapper rolls R driven in any desired manner, and the ears or the like separated from the stalks are adapted to fall within the hopper H feeding to the elevating mechanism E of any ordinary or preferred type.

The stalks after passing between the snapper rolls R are operated upon by the cutting mechanism M which serves to cut or chop the stalks into fodder. The fodder is conveyed by the chute A to the axial center of the fan casing F. Mounted within the casing F is the fan 1 which serves to throw the fodder upwardly through the pipe P to a mow or other locality.

In practice it has been found that as the ears fall from the rolls R to the hopper H there is a great deal of chaff and fodder which falls therewith. In order to collect such chaff and fodder I have in communication with the chute A which is of a tubular type, the pipe or tubular member 2 which is of such a length as to terminate above but in close proximity to the hopper H. The pipe or tubular member 2 serves as the air inlet of the casing F and it will at once be self-evident that the suction created by the fan 1 through the pipe or tubular member 2 will result in the conveying of the chaff or fodder which may be dropping with the ears, into the casing F and up through the blower pipe P. By this arrangement it will be at once self-evident that the grade of the ears conveyed by the elevating mechanism E will be of the highest quality.

From the foregoing description, it is thought to be obvious that a corn snapper and thresher constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination with snapper rolls, an inclosed chute leading therefrom and a suction member coacting with the chute, a hopper positioned below the snapper rolls, and a tubular member in communication with the chute and terminating in close proximity to the hopper at a point thereabove, said tubular member serving as the air inlet for the suction member.

In testimony whereof I hereunto affix my signature in the presence of two witnesses.

CLARENCE W. NEU.

Witnesses:
M. H. SHINKLE,
B. EDNA WILLIAMS.

Copies of this patent may be obtained for five cents each, by addressing the "Commissioner of Patents, Washington, D. C."